(12) United States Patent
Sugiyama

(10) Patent No.: US 6,735,159 B2
(45) Date of Patent: May 11, 2004

(54) WRITE PULSE GENERATOR AND OPTICAL DISK UNIT

(75) Inventor: Ryohsuke Sugiyama, Osaka (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/196,432

(22) Filed: Jul. 15, 2002

(65) Prior Publication Data

US 2003/0016608 A1 Jan. 23, 2003

(30) Foreign Application Priority Data

Jul. 17, 2001 (JP) ........................................ 2001-216610

(51) Int. Cl.[7] .............................................. G11B 7/00
(52) U.S. Cl. .................... 369/59.11; 369/47.51; 369/47.28
(58) Field of Search .................... 369/47.22, 47.51, 369/47.28, 59.11, 53.34, 59.12

(56) References Cited

U.S. PATENT DOCUMENTS 6,628,586 B1 * 9/2003 Senshu .................... 369/47.22

FOREIGN PATENT DOCUMENTS

JP  8249702  9/1996

* cited by examiner

*Primary Examiner*—Nabil Hindi
(74) *Attorney, Agent, or Firm*—Cooper & Dunham LLP

(57) ABSTRACT

A write pulse generator is provided with an adjusting section which adjusts a width of write pulses to be generated, a plurality of registers in which control values of adjusting made by the adjusting section are set, a selecting section which selects a control value from the registers and supplies the control value to the adjusting section, and a timing generator. The registers are successively arranged in a plurality of stages so that the control values are successively copied to the registers in subsequent stages. The timing generator generates timings at which the control values are successively copied to the registers in the subsequent stages. The selecting section selects and supplies to the adjusting section the control value held by a register in a final stage.

12 Claims, 4 Drawing Sheets

10L

10A

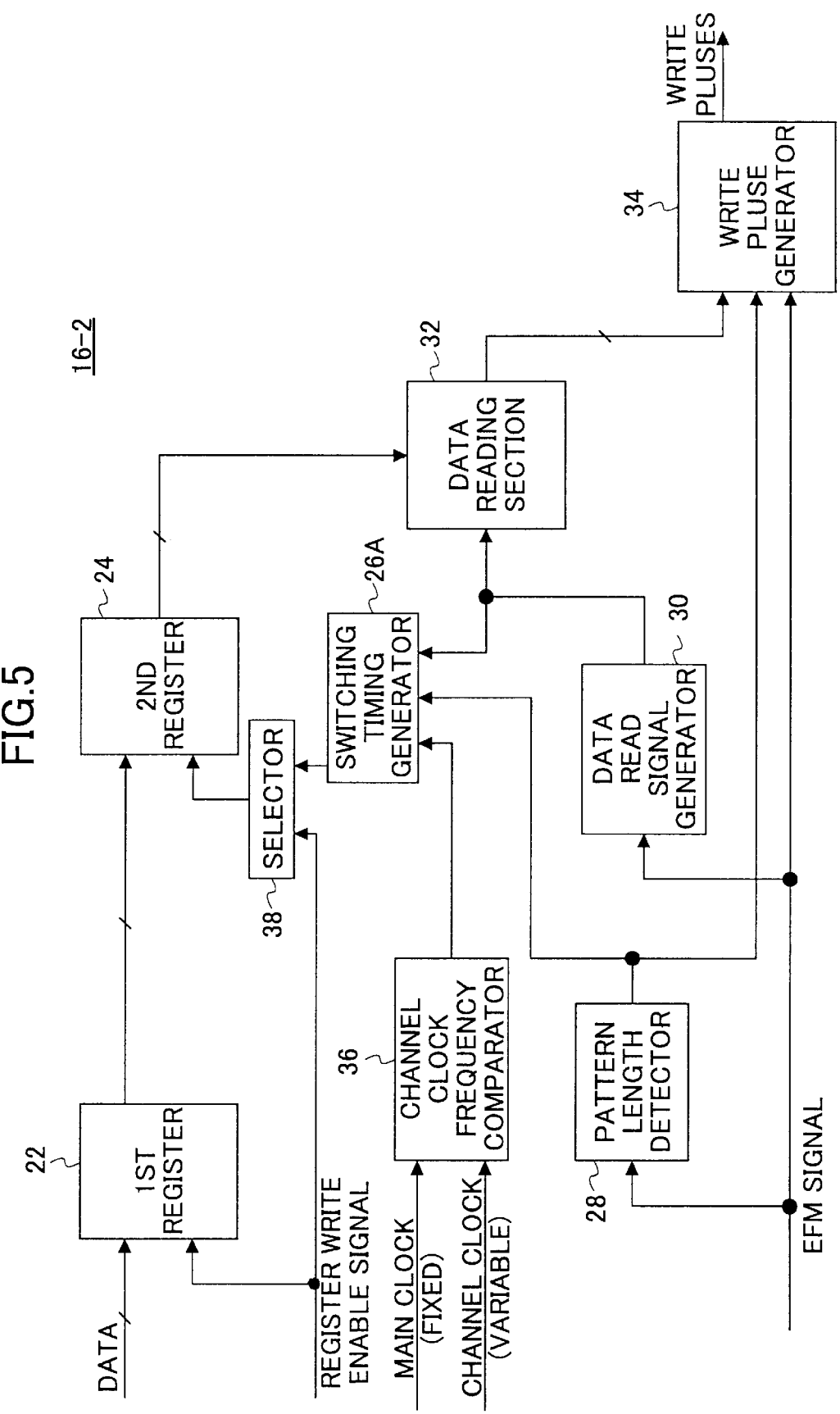

WRITE PULSE GENERATOR AND OPTICAL DISK UNIT

BACKGROUND OF THE INVENTION

This application claims the benefit of a Japanese Patent Application No.2001-216610 filed Jul. 17, 2001, in the Japanese Patent Office, the disclosure of which is hereby incorporated by reference.

1. Field of the Invention

The present invention generally relates to write pulse generators and optical disk units, and more particularly to a write pulse generator for generating write pulses in an optical disk unit employing a constant angular velocity (CAV) recording system and to an optical disk unit which uses such a write pulse generator.

2. Description of the Related Art

FIG. 1 is a diagram showing an optical disk 10L employing a constant linear velocity (CLV) recording system. In the case of the optical disk 10L, a channel bit period T which is used as a reference for the recording and reproduction is always constant. A recording pit pattern, which is described by a ratio to the channel bit, that is, an integer multiple of the channel bit, is also formed at a constant linear density.

However, in the optical disk 10L, a rotational speed (or a number of revolutions per unit time) must be changed depending on a radial position where the recording or reproducing operation is carried out. In other words, the rotational speed of the optical disk 10L must be finely controlled to become inversely proportional to the radial position where the recording or reproducing operation is carried out, so that the rotational speed is lower at an outer periphery of the optical disk 10L and is higher at an inner periphery of the optical disk 10L.

FIG. 2 is a diagram showing an optical disk 10A employing a CAV recording system. In the case of the optical disk 10A, the rotational speed (number of revolutions per unit time) is constant. However, the channel bit frequency must be set lower at the outer periphery of the optical disk 10A, and set higher at the inner periphery of the optical disk 10A.

In an optical disk unit which is loaded with the optical disk, such as the optical disk 10L or 10A, desired recording pit patterns are formed by irradiating a laser beam which is emitted from a laser diode onto the optical disk, so as to record information on the optical disk.

When irradiating the laser beam on the optical disk, it is known that the duration of the laser beam emission needs to be finely adjusted, by taking into consideration the characteristic of the optical disk itself, the state of the optical disk unit at the time of the recording, the state of the optical disk at the time of the recording, and the like.

In other words, the duration of the laser beam emission for generating the recording pit pattern must be variably controlled depending on the characteristic and recording state of the optical disk. For example, a method proposed in a Japanese Laid-Open Patent Application No.8-249702 realizes such a variable control by generating write pulses which is subjected to a pulse width control (write strategy). An adjusting width of this pulse width control (write strategy) is described by a ratio with respect to T (an integer multiple of T).

Next, a description will be given of a problem associated with the pulse width control (write strategy) in the optical disk unit employing the CAV recording system.

Conventionally, a writable compact disc (CD) employs the CLV recording system. In the optical disk unit employing the CLV recording system, a channel clock (channel bit) period T which is used as a reference for the recording and reproduction does not change because the linear velocity is constant. Hence, pattern lengths of the individual pit patterns described by sizes of 3T to 11T also do not change. The write pulse width is finely adjusted by the pulse width control (write strategy), so as to optimize the recording quality of the optical disk with respect to the pit patterns. The pulse width control (write strategy) is unaffected by the radial position where the recording operation is carried out.

In the optical disk unit employing the CAV recording system, the angular velocity is constant, and for this reason, the width of 1T must be changed depending on the radial position where the recording operation is carried out. For example, in the case of an 8-times speed optical disk unit employing the CAV recording system, it is possible to use a channel clock equivalent to that of an 8-times speed optical disk unit employing the CLV recording system at the outer periphery of the optical disk, but a channel clock similar to that of a 3-times speed optical disk unit employing the CLV recording system must be used at the inner periphery of the optical disk. For the pulse width of 1T, a difference of 40 ns or greater exists between the channel clocks for the outer periphery and) the inner periphery of the optical disk.

Consequently, the pulse width control (write strategy) which takes into consideration the characteristic of the optical disk itself, the state of the optical disk unit at the time of the recording, the state of the optical disk at the time of the recording, and the like, must also be changed depending on the radial position where the recording operation is carried out. The pulse width control (write strategy adjusts the pulse width with respect to each of the pit patterns, such as 3T, 4T, 5T, . . . , and 11T. Hence, in the optical disk unit employing the CAV recording system, the radial position where the recording operation is carried becomes a determining factor also when determining the relationship of the pit pattern length (width) and the adjusting width of the write strategy.

In other words, although the adjusting width of the pulse width adjustment (write strategy) with respect to one pit pattern is not dependent on the radial position where the recording operation is carried out in the case of the optical disk unit employing the CLV recording system, it is necessary to regularly change a set value of the adjusting width of the write strategy depending on the linear velocity, that is, the radial position where the recording operation is carried out, in the case of the optical disk unit employing the CAV recording system.

SUMMARY OF THE INVENTION

Accordingly, it is a general object of the present invention to provide a novel and useful write pulse generator and optical disk unit, in which the problems described above are eliminated.

Another and more specific object of the present invention is to provide a write pulse generator and an optical disk unit which can regularly change a set value of an adjusting width of a pulse width control (write strategy) with respect to a pit pattern depending on a radial position where a recording operation is carried out.

Still another object of the present invention is to provide a write pulse generator comprising an adjusting section adjusting a width of write pulses to be generated; a plurality of registers in which control values of adjusting made by the adjusting section are set; a selecting section selecting a control value from the registers and supplying the control value to the adjusting section; and a timing generator, where the registers are successively arranged in a plurality of stages so that the control values are successively copied to the registers in subsequent stages, the timing generator generates timings at which the control values are successively copied to the registers in the subsequent stages, and the selecting section selects and supplies to the adjusting section the control value held by a register in a final stage. According to the write pulse generator of the present invention, it is possible to regularly change a set value of an adjusting width of a pulse width control (write strategy) with respect to a pit pattern on an optical recording medium such as an optical disk depending on a radial position where a recording operation is carried out.

A further object of the present invention is to provide an optical disk unit for writing data on an optical disk during a recording by a light beam which is emitted in response to write pulses, comprising a write pulse generator generating the write pulses, where the write pulse generator comprises an adjusting section adjusting a width of write pulses to be generated during the recording; a plurality of registers in which control values of adjusting made by the adjusting section are set; a selecting section selecting a control value from the registers and supplying the control value to the adjusting section; and a timing generator, and the registers are successively arranged in a plurality of stages so that the control values are successively copied to the registers in subsequent stages, the timing generator generates timings at which the control values are successively copied to the registers in the subsequent stages, and the selecting section selects and supplies to the adjusting section the control value held by a register in a final stage. According to the optical disk unit of the present invention, it is possible to regularly change a set value of an adjusting width of a pulse width control (write strategy) with respect to a pit pattern on the optical disk depending on a radial position where a recording operation is carried out.

Another object of the present invention is to provide a write pulse generator comprising adjusting means for adjusting a width of write pulses to be generated; holding means for holding control values of adjusting used by the adjusting means; selecting means for selecting a control value from the holding means and supplying the control value to the adjusting means; and timing generating means, where the holding means comprises a plurality of registers successively arranged in a plurality of stages so that the control values are successively copied to the registers in subsequent stages, the timing generating means generates timings at which the control values are successively copied to the registers in the subsequent stages, and the selecting means selects and supplies to the adjusting means the control value held by a register in a final stage. According to the write pulse generator of the present invention, it is possible to regularly change a set value of an adjusting width of a pulse width control (write strategy) with respect to a pit pattern on an optical recording medium such as an optical disk depending on a radial position where a recording operation is carried out.

Still another object of the present invention is to provide an optical disk unit for writing data on an optical disk during a recording by a light beam which is emitted in response to write pulses, comprising a write pulse generator generating the write pulses, where the write pulse generator comprises adjusting means for adjusting a width of write pulses to be generated during the recording; holding means for holding control values of adjusting used by the adjusting means; selecting means for selecting a control value from the holding means and supplying the control value to the adjusting means; and a timing generating means, and the holding means comprises a plurality of registers successively arranged in a plurality of stages so that the control values are successively copied to the registers in subsequent stages, the timing generating means generates timings at which the control values are successively copied to the registers in the subsequent stages, and the selecting means selects and supplies to the adjusting means the control value held by a register in a final stage. According to the optical disk unit of the present invention, it is possible to regularly change a set value of an adjusting width of a pulse width control (write strategy) with respect to a pit pattern on the optical disk depending on a radial position where a recording operation is carried out.

Other objects and further features of the present invention will be apparent from the following detailed description when read in conjunction with the accompanying drawings.

BRIEF DESCRIPTION OF THE DRAWINGS

FIG. 5 is a system block diagram showing a second embodiment of the write pulse generator according to the present invention.

DESCRIPTION OF THE PREFERRED EMBODIMENTS

Figure 1:
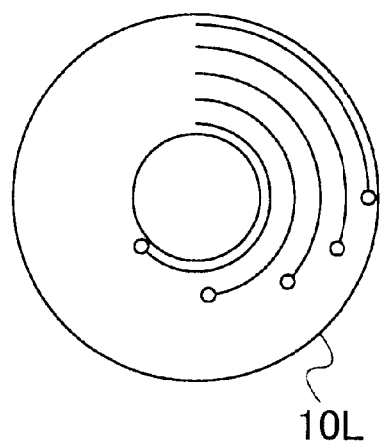
FIG. 1 is a diagram showing an optical disk employing a CLV recording system.
Figure 2:
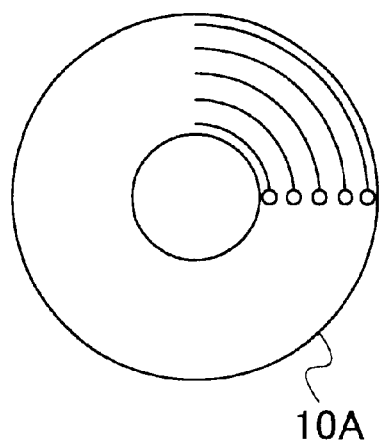
FIG. 2 is a diagram showing an optical disk employing a CAV recording system.
Figure 3:
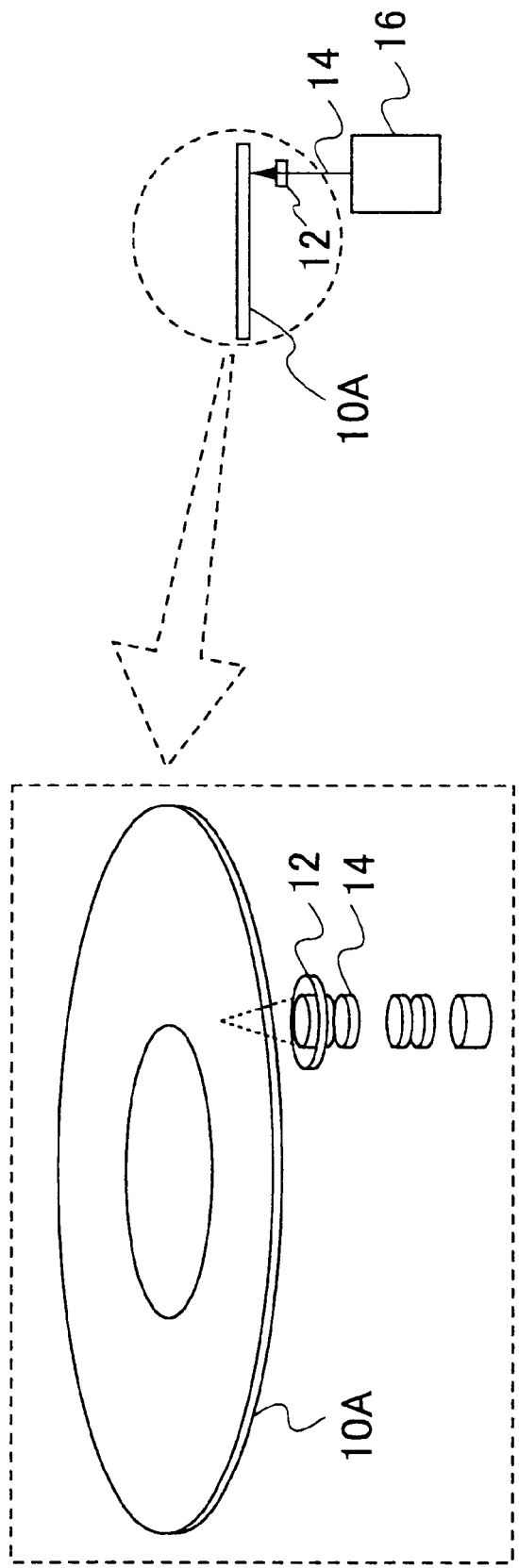
FIG. 3 is a diagram showing a general structure of an embodiment of an optical disk unit according to the present invention employing the CAV recording system.

FIG. 3 is a diagram showing a general structure of an embodiment of an optical disk unit according to the present invention employing the CAV recording system.

In FIG. 3, an optical disk 10A is rotated at a constant angular velocity by a known means (not shown). A laser beam 14 is emitted from a laser light source (not shown) such as a laser diode, and is irradiated on a surface of the optical disk 10A via a lens 12 which converges the laser beam 14 on the optical disk 10A. As shown in the right portion of FIG. 3 on an enlarge scale, the laser beam 14 is emitted in response to write pulses generated in a write pulse generator 16 according to the present invention. Hence, as shown in the left portion of FIG. 3, the laser beam 16 is made up of pulses. Since the optical disk 10A is rotated at the constant angular velocity, pits are formed on the surface of the optical disk 10A by the pulse laser beam 14.

Figure 4:
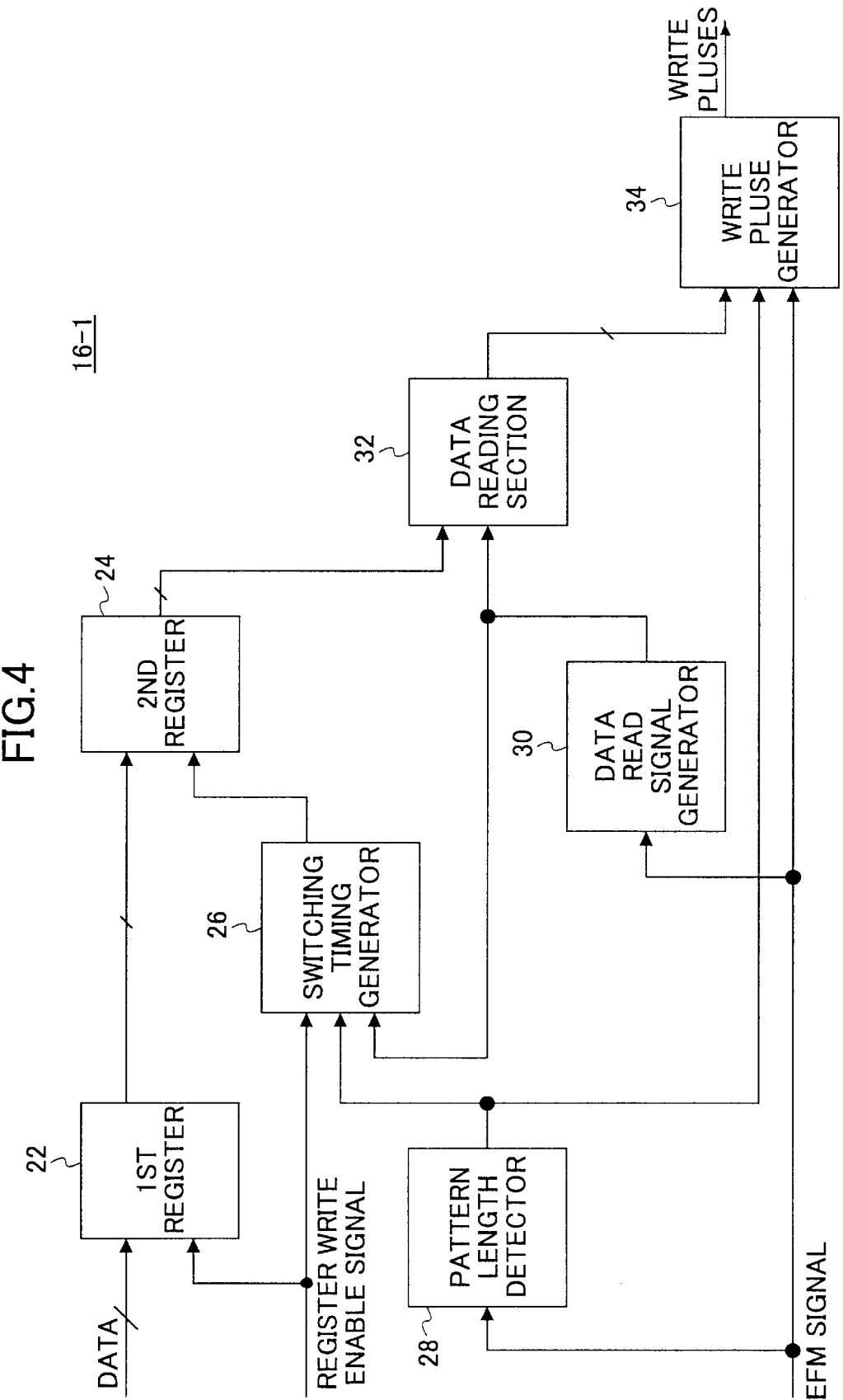
FIG. 4 is a system block diagram showing a first embodiment of a write pulse generator according to the present invention.

FIG. 4 is a system block diagram showing a first embodiment of a write pulse generator according to the present invention. A write pulse generator 16-1 includes a first register 22, a second register 24, a switching timing generator 26, a pattern length detector 28, a data read signal generator 30, a data reading section 32, and a write pulse generating section 34 which are connected as shown in FIG. 4.

The first and second registers 22 and 24 are used to hold set values of a pulse width control (write strategy). The first register 22 reads a content of a set value of the pulse width control (write strategy) in response to an external write enable signal (register write enable signal). Before a write operation (recording operation) starts, the content of the set value to the first register 22 is unconditionally read by the second register 24. After the write operation starts, the second register 24 can no longer read the content held in the first register 22 due to the operation of the switching timing generator 26, that is, under control of a register write enable signal (which indicates a register write disable) from the switching timing generator 26. The content of the set value held in the second register 24 is supplied to the write pulse generating section 34 via the data reading section 32, in response to a data read enable signal generated from the data read signal generator 30. The data read signal generator 30 generates the data read enable signal based on an eight-to-fourteen modulation (8–14 modulation or simply EFM) signal on which the write pulses are based. The write pulse generating section 34 generates and outputs the write pulses, based on the content of the set value held in the second register 24.

When changing the set value of the pulse width control (write strategy) during the write operation of the optical disk unit, the first register 22 is first made to read the set value of the pulse width control (write strategy) which optimizes the write pulse width. Then, in order to reflect the content held in the first register 22 to the second register 24, the switching timing generator 26 generates a register write enable signal with respect to the second register 24.

The switching timing generator 26 generates the register write enable signal with respect to the second register 24 only when all of the following conditions c1 through c3 are satisfied.

c1: The first register 22 is not reading data;
c2: The write pulse generating section 34 is not reading data from the second register 24; and
c3: The second register 24 can secure a time required for reading data from the first register 22.

It is possible to judge whether or not the condition c3 is satisfied, in the following manner. In other words, a space pattern indicating an end of a frame appears for every frame length, that is, for every predetermined data length of 588 bits, for example. Normally, the space pattern has a length of 11T or 14T. In this embodiment, the pattern length detector 28 detects the space pattern. The detection of the space pattern by the pattern length detector 28 is notified to the switching timing generator 26 which uses this information as a condition for generating the register write enable signal with respect to the second register 24.

The content of the setting value of the pulse width control (write strategy) with respect to the second register 24 is updated to the content of the setting value of the pulse width control held by the first register 22, every time the space pattern of 11T or 14T appears.

The setting value of the optimum pulse width control (write strategy) in this first embodiment can be calculated from time information or the like prerecorded on the optical disk 10A. In addition, the setting value of the optimum value of the pulse width control (write strategy) may be calculated by other methods. By reading the setting value of the optimum pulse width control (write strategy) into the first register 22, the write pulse generator 16-1 can always output optimum write pulses.

Therefore, according to this first embodiment, it is possible to regularly change a set value of an adjusting width of a pulse width control (write strategy) with respect to a pit pattern on the optical disk depending on a radial position where a recording operation is carried out.

FIG. 5 is a system block diagram showing a second embodiment of the write pulse generator according to the present invention. In FIG. 5, those parts which are the same as those corresponding parts in FIG. 4 are designated by the same reference numerals, and a description thereof will be omitted.

In a write pulse generator 16-2 shown in FIG. 5, a switching timing generator 26A is provided in place of the switching timing generator 26 shown in FIG. 4. In addition, the write pulse generator 16-2 is additionally provided with a channel clock frequency comparator 36 and a selector 38 which are connected as shown in FIG. 5. The selector 38 is switched depending on whether or not the EFM signal is output. In other words, the selector 38 is switched to immediately reflect the content of the first register 22 to the second register 24 when no EFM signal is output, that is, when not during the recording operation.

This second embodiment compares the frequencies of a channel clock which has a varying frequency and a main clock which has a fixed frequency, so as to enable setting of the setting value of the pulse width control (write strategy) in advance.

The first register 22 reads the setting value of the pulse width control (write strategy) used after the write operation starts. On the other hand, the second register 24 reads the setting value of the pulse width control (write strategy), which is to be read by the data reading section 32.

When the write operation starts, the first register 22 is set to a state where changing of the content thereof from the outside is disabled, in response to the register write enable signal (which indicates a register write disable).

The channel clock is compared in the channel clock frequency comparator 36 with the main clock which has the fixed frequency. If the channel clock frequency becomes lower than the fixed frequency, the channel clock frequency comparator 36 outputs to the switching timing generator 26A a switching signal for switching the setting value of the pulse width control (write strategy).

When the switching signal for switching the setting value of the pulse width control (write strategy) is output from the channel clock frequency comparator 36 and the space pattern is then output by the EFM signal, the pattern length detector 28 detects the space pattern and notifies this information to the switching timing generator 26A. The switching timing generator 26A outputs a signal when the switching signal is received from the channel clock frequency comparator 36 and the detection of the space pattern is notified from the pattern length detector 28. The setting value of the pulse width control (write strategy) held in the first register 22 is loaded into the second register 24 in response to the signal output from the switching timing generator 26A via the selector 38. When a next data read enable signal is generated from the data read signal generator 30, setting value of the pulse width control (write strategy) held in the second register 24 is read by the write pulse generating section 34 via the data reading section 32.

Except for the time (timing) when the setting value is being loaded into the second register 24, the first register 22 is enabled of reading the data from the outside. Accordingly, it is possible to read into the first register 22 in advance a setting value of the pulse width control (write strategy) which is to be used when the channel clock frequency becomes even lower. Hence, when the reference frequency is again set by the main clock and the channel clock frequency becomes lower than this reference frequency, an operation similar to that described above is carried out.

By repeating the above described operation, it becomes possible to continuously switch the setting value of the pulse width control (write strategy) depending on the channel clock frequency. As a result, it is possible to always output optimum write pulses.

Therefore, according to this second embodiment, it is possible to regularly change a set value of an adjusting width of a pulse width control (write strategy) with respect to a pit pattern on the optical disk depending on a radial position where a recording operation is carried out. In addition, it is possible to change the setting value of the pulse width control (write strategy) at a desired timing.

The present invention is of course applicable to various kinds or types of optical disks, including CD-R/RW, DVD-R/RW and DVD+RW.

Further, the present invention is not limited to these embodiments, but various variations and modifications may be made without departing from the scope of the present invention.

What is claimed is:

1. A write pulse generator comprising:
    an adjusting section adjusting a width of write pulses to be generated;
    a plurality of registers in which control values of adjusting made by said adjusting section are set;
    a selecting section selecting a control value from said registers and supplying the control value to said adjusting section; and
    a timing generator,
    said registers being successively arranged in a plurality of stages so that the control values are successively copied to the registers in subsequent stages,
    said timing generator generating timings at which the control values are successively copied to the registers in the subsequent stages,
    said selecting section selecting and supplying to said adjusting section the control value held by a register in a final stage.

2. The write pulse generator as claimed in claim 1, further comprising:
    a detector detecting a specific pulse length of the write pulses,
    said timing generator generating one of said timings based on a timing at which said detector detects the specific pulse length.

3. The write pulse generator as claimed in claim 2, further comprising:
    a comparator comparing a frequency of a channel clock having a variable frequency and a frequency of a clock having a fixed frequency, and outputting a compared result,
    said timing generator generating one of said timings depending on the compared result.

4. An optical disk unit for writing data on an optical disk during a recording by a light beam which is emitted in response to write pulses, comprising:
    a write pulse generator generating the write pulses,
    said write pulse generator comprising:
        an adjusting section adjusting a width of write pulses to be generated during the recording;
        a plurality of registers in which control values of adjusting made by said adjusting section are set;
        a selecting section selecting a control value from said registers and supplying the control value to said adjusting section; and
        a timing generator,
        said registers being successively arranged in a plurality of stages so that the control values are successively copied to the registers in subsequent stages,
        said timing generator generating timings at which the control values are successively copied to the registers in the subsequent stages,
        said selecting section selecting and supplying to said adjusting section the control value held by a register in a final stage.

5. The optical disk unit as claimed in claim 4, wherein said write pulse generator further comprises a detector detecting a specific pulse length of the write pulses, said timing generator generating one of said timings based on a timing at which said detector detects the specific pulse length.

6. The optical disk unit as claimed in claim 5, wherein said write pulse generator further comprises a comparator comparing a frequency of a channel clock having a variable frequency and a frequency of a clock having a fixed frequency, and outputting a compared result, said timing generator generating one of said timings depending on the compared result.

7. A write pulse generator comprising:
    adjusting means for adjusting a width of write pulses to be generated;
    holding means for holding control values of adjusting used by said adjusting means;
    selecting means for selecting a control value from said holding means and supplying the control value to said adjusting means; and
    timing generating means,
    said holding means comprising a plurality of registers successively arranged in a plurality of stages so that the control values are successively copied to the registers in subsequent stages,
    said timing generating means generating timings at which the control values are successively copied to the registers in the subsequent stages,
    said selecting means selecting and supplying to said adjusting means the control value held by a register in a final stage.

8. The write pulse generator as claimed in claim 7, further comprising:
    detecting means for detecting a specific pulse length of the write pulses,
    said timing generating means generating one of said timings based on a timing at which said detecting means detects the specific pulse length.

9. The write pulse generator as claimed in claim 8, further comprising:
    comparing means for comparing a frequency of a channel clock having a variable frequency and a frequency of a clock having a fixed frequency, and outputting a compared result,
    said timing generating means generating one of said timings depending on the compared result.

10. An optical disk unit for writing data on an optical disk during a recording by a light beam which is emitted in response to write pulses, comprising:
    a write pulse generator generating the write pulses,
    said write pulse generator comprising:
        adjusting means for adjusting a width of write pulses to be generated during the recording;
        holding means for holding control values of adjusting used by said adjusting means;

selecting means for selecting a control value from said holding means and supplying the control value to said adjusting means; and a timing generating means, said holding means comprising a plurality of registers successively arranged in a plurality of stages so that the control values are successively copied to the registers in subsequent stages, said timing generating means generating timings at which the control values are successively copied to the registers in the subsequent stages, said selecting means selecting and supplying to said adjusting means the control value held by a register in a final stage.

11. The optical disk unit as claimed in claim 10, wherein said write pulse generator further comprises detecting means for detecting a specific pulse length of the write pulses, said timing generating means generating one of said timings based on a timing at which said detecting means detects the specific pulse length.

12. The optical disk unit as claimed in claim 11, wherein said write pulse generating means further comprises comparing means comparing a frequency of a channel clock having a variable frequency and a frequency of a clock having a fixed frequency, and outputting a compared result, said timing generating means generating one of said timings depending on the compared result.

* * * * *